(12) United States Patent
Schrell et al.

(10) Patent No.: US 12,441,478 B2
(45) Date of Patent: Oct. 14, 2025

(54) AIR INLET BULKHEAD ASSEMBLY FOR AN AIRCRAFT PROPULSION SYSTEM

(71) Applicant: Rohr, Inc., Chula Vista, CA (US)

(72) Inventors: Johann Schrell, San Diego, CA (US); Brian A. Sherman, Chula Vista, CA (US)

(73) Assignee: Rohr, Inc., Chula Vista, CA (US)

( * ) Notice: Subject to any disclaimer, the term of this patent is extended or adjusted under 35 U.S.C. 154(b) by 55 days.

(21) Appl. No.: 18/102,508

(22) Filed: Jan. 27, 2023

(65) Prior Publication Data
US 2024/0253801 A1 Aug. 1, 2024

(51) Int. Cl.
*B64D 33/02* (2006.01)
*F02C 7/05* (2006.01)

(52) U.S. Cl.
CPC .............. *B64D 33/02* (2013.01); *F02C 7/05* (2013.01); *B64D 2033/022* (2013.01)

(58) Field of Classification Search
CPC ........................ B64D 33/02; B64D 2033/022
See application file for complete search history.

(56) References Cited

U.S. PATENT DOCUMENTS

| | | | | |
|---|---|---|---|---|
| 5,725,709 A * | 3/1998 | Jensen | ........... | B64D 33/02 156/169 |
| 7,923,668 B2 * | 4/2011 | Layland | ........... | B64D 15/12 219/535 |
| 8,197,191 B2 * | 6/2012 | Binks | ........... | B64D 29/08 415/214.1 |
| 9,708,072 B2 | 7/2017 | Lumbab | | |
| 10,556,701 B2 * | 2/2020 | Schrell | ........... | B64D 33/02 |
| 11,125,157 B2 | 9/2021 | Thomas | | |
| 2007/0272799 A1 | 11/2007 | Verdan | | |
| 2012/0118400 A1 | 5/2012 | Bouillon | | |
| 2019/0195085 A1 | 6/2019 | Frédéric | | |

FOREIGN PATENT DOCUMENTS

FR 3100796 A1 3/2021

OTHER PUBLICATIONS

Translation of FR-3100796 (Year: 2019).*
EP Search Report for EP Patent Application No. 24154431.1 dated May 31, 2024.

* cited by examiner

*Primary Examiner* — Joshua J Michener
*Assistant Examiner* — Michael B. Kreiner
(74) *Attorney, Agent, or Firm* — Getz Balich LLC

(57) ABSTRACT

An air inlet for an aircraft propulsion system nacelle includes an outer skin, an inner skin, a lip skin, and a forward bulkhead. The lip skin extends between and to an outer end and an inner end. The outer end is disposed at the outer skin. The inner end is disposed at the inner skin. The forward bulkhead includes a first bulkhead portion and a second bulkhead portion. The first bulkhead portion and the second bulkhead portion are mounted to the outer skin. The first bulkhead portion and the second bulkhead portion are mounted to the inner skin. The first bulkhead portion includes a rigid body material and the second bulkhead portion includes a flexible body material.

20 Claims, 6 Drawing Sheets

AIR INLET BULKHEAD ASSEMBLY FOR AN AIRCRAFT PROPULSION SYSTEM

BACKGROUND

1. Technical Field

This disclosure relates generally to an air inlet for a propulsion system nacelle, and more particularly to a bulkhead assembly for an air inlet.

2. Background Information

Aircraft propulsion systems may be susceptible to high-velocity impacts from birds (e.g., bird strikes) during flight. In particular, propulsion system housings (e.g., nacelles) may be configured to resist bird strike impacts. Various types and configurations of propulsion system housings are known in the art. While these known propulsion system housings have various advantages, there is still room in the art for improvement. There is a need in the art, therefore, for an improved propulsion system housing which is resistant to bird strike impacts.

SUMMARY

It should be understood that any or all of the features or embodiments described herein can be used or combined in any combination with each and every other feature or embodiment described herein unless expressly noted otherwise.

According to an aspect of the present disclosure, an air inlet for an aircraft propulsion system nacelle includes an outer skin, an inner skin, a lip skin, and a forward bulkhead. The outer skin extends circumferentially about an axial centerline of the air inlet. The inner skin extends circumferentially about the axial centerline. The inner skin is disposed radially inward of the outer skin. The lip skin extends circumferentially about the axial centerline. The lip skin extends between and to an outer end and an inner end. The outer end is disposed at the outer skin. The inner end is disposed at the inner skin. The lip skin forms a leading edge of the air inlet. The forward bulkhead extends circumferentially about the axial centerline. The forward bulkhead includes a first bulkhead portion and a second bulkhead portion. The first bulkhead portion extends between and to a first outer end and a first inner end. The second bulkhead portion extends between and to a second outer end and a second inner end. The first bulkhead portion and the second bulkhead portion are mounted to the outer skin at the first outer end and the second outer end, respectively. The first bulkhead portion and the second bulkhead portion are mounted to the inner skin at the first inner end and the second inner end, respectively. The first bulkhead portion includes a rigid body material and the second bulkhead portion includes a flexible body material.

In any of the aspects or embodiments described above and herein, the rigid body material may include a thermoplastic composite material.

In any of the aspects or embodiments described above and herein, the flexible body material may include one or more layers of a woven fabric.

In any of the aspects or embodiments described above and herein, each layer of the one or more layers of the woven fabric may include synthetic fibers assembled together in an overlapping woven pattern.

In any of the aspects or embodiments described above and herein, the flexible body material may include the one or more layers of the woven fabric embedded in a thermoplastic matrix.

In any of the aspects or embodiments described above and herein, the one or more layers of the woven fabric may include a first woven fabric layer and the first woven fabric layer may include one or more overlapping folds held in place by one or more stitches.

In any of the aspects or embodiments described above and herein, the first bulkhead portion may be disposed axially forward of the second bulkhead portion.

In any of the aspects or embodiments described above and herein, the second bulkhead portion may extend along the first bulkhead portion from the second outer end to the second inner end.

In any of the aspects or embodiments described above and herein, the first bulkhead portion and the second bulkhead portion may be mounted to the outer skin by a first fastener at the first outer end and the second outer end, respectively, and the first bulkhead portion and the second bulkhead portion may be mounted to the inner skin by a second fastener at the first inner end and the second inner end, respectively.

In any of the aspects or embodiments described above and herein, the first bulkhead portion and the second bulkhead portion may be mounted to the outer skin by a first weld joint at the first outer end and the second outer end, respectively, and the first bulkhead portion and the second bulkhead portion may be mounted to the inner skin by a second weld joint at the first inner end and the second inner end, respectively.

According to another aspect of the present disclosure, an air inlet for an aircraft propulsion system nacelle includes an outer skin, an inner skin, a lip skin, and a forward bulkhead. The outer skin extends circumferentially about an axial centerline of the air inlet. The inner skin extends circumferentially about the axial centerline. The inner skin is disposed radially inward of the outer skin. The lip skin extends circumferentially about the axial centerline. The lip skin extends between and to an outer end and an inner end. The outer end is disposed at the outer skin. The inner end is disposed at the inner skin. The lip skin forms a leading edge of the air inlet. The forward bulkhead extends between and is mounted to the outer skin and the inner skin. The forward bulkhead includes a first bulkhead portion and a second bulkhead portion. The first bulkhead portion is disposed adjacent and axially forward of the second bulkhead portion. The first bulkhead portion includes a rigid body material and the second bulkhead portion includes a flexible body material.

In any of the aspects or embodiments described above and herein, the second bulkhead portion may be bonded to the first bulkhead portion.

In any of the aspects or embodiments described above and herein, the rigid body material may include a thermoplastic material.

In any of the aspects or embodiments described above and herein, the flexible body material may include one or more layers of a woven fabric.

In any of the aspects or embodiments described above and herein, the first bulkhead portion and the second bulkhead portion are mounted together.

According to another aspect of the present disclosure, an air inlet for an aircraft propulsion system nacelle includes an outer skin, an inner skin, a lip skin, and a forward bulkhead. The outer skin extends circumferentially about an axial centerline of the air inlet. The inner skin extends circumferentially about the axial centerline. The inner skin is disposed radially inward of the outer skin. The lip skin extends circumferentially about the axial centerline. The lip skin extends between and to an outer end and an inner end. The outer end is disposed at the outer skin. The inner end is disposed at the inner skin. The lip skin forms a leading edge of the air inlet. The forward bulkhead extends circumferentially about the axial centerline. The forward bulkhead includes a first bulkhead portion and a second bulkhead portion. The first bulkhead portion extends between and to a first outer end and a first inner end. The second bulkhead portion extends between and to a second outer end and a second inner end. The first outer end is disposed at the outer skin and the first inner end is disposed at the inner skin. The second outer end and the second inner end are disposed at the first bulkhead portion. The first bulkhead portion includes a rigid body material and the second bulkhead portion includes a flexible body material.

In any of the aspects or embodiments described above and herein, the first bulkhead portion may be disposed axially forward of the second bulkhead portion.

In any of the aspects or embodiments described above and herein, the second bulkhead portion may extend along the first bulkhead portion from the second outer end to the second inner end.

In any of the aspects or embodiments described above and herein, the first bulkhead portion and the second bulkhead portion may be mounted to the outer skin by a first fastener at the first outer end and the second outer end, respectively.

In any of the aspects or embodiments described above and herein, the first bulkhead portion and the second bulkhead portion may be mounted to the outer skin by a first weld joint at the first outer end and the second outer end, respectively.

The present disclosure, and all its aspects, embodiments and advantages associated therewith will become more readily apparent in view of the detailed description provided below, including the accompanying drawings.

DETAILED DESCRIPTION

Figure 1:
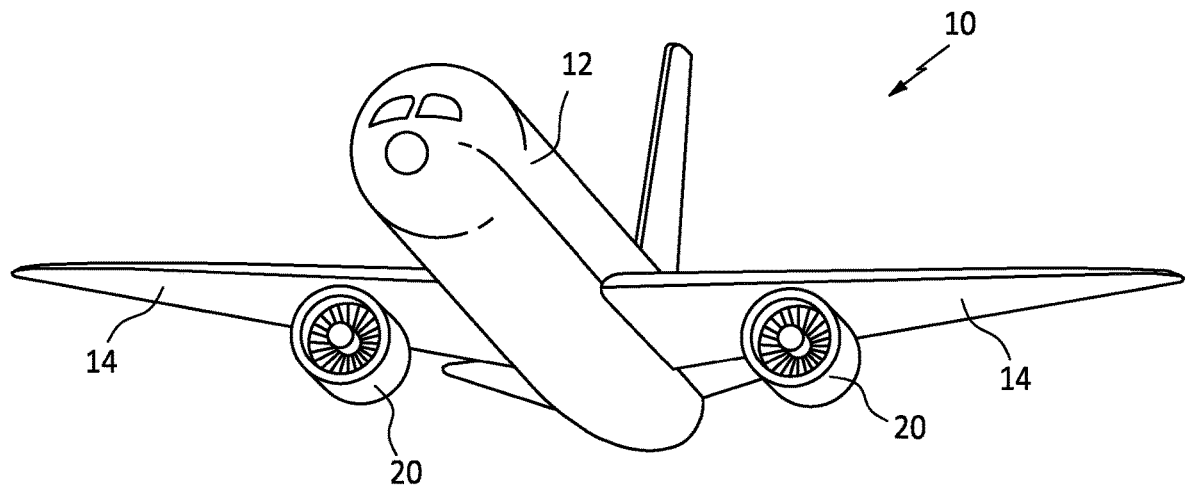
FIG. 1 illustrates a perspective view of an aircraft including propulsion systems, in accordance with one or more embodiments of the present disclosure.

FIG. 1 illustrates an aircraft 10 including propulsion systems 20. The aircraft 10 of FIG. 1 generally includes a fuselage 12 and wings 14 extending outward from the fuselage 12. Each of the propulsion systems 20 of FIG. 1 are mounted to and below a respective wing 14. The present disclosure, however, is not limited to any particular mounting configuration or quantity for the propulsion systems 20.

Figure 2:
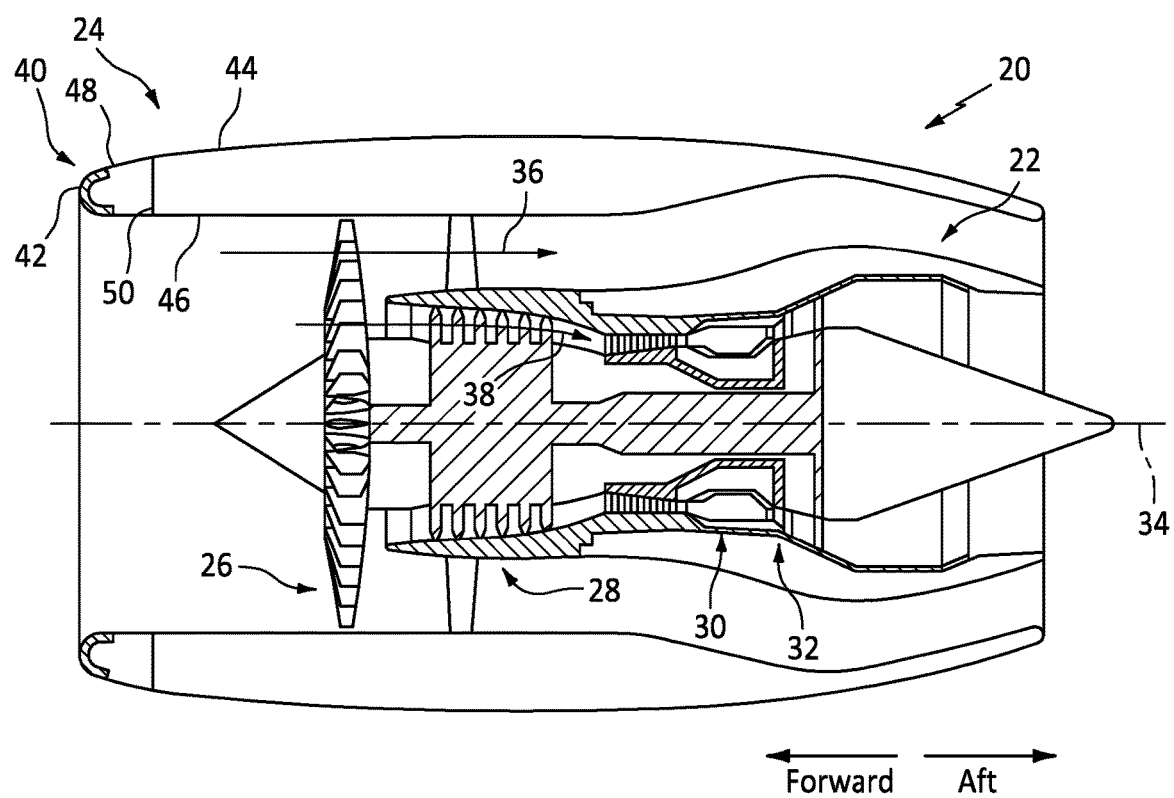
FIG. 2 illustrates a schematic, cutaway view of an aircraft propulsion system, in accordance with one or more embodiments of the present disclosure.

FIG. 2 illustrates a side, cutaway view of an exemplary embodiment of the propulsion system 20. The propulsion system 20 of FIG. 2 includes a gas turbine engine 22 and a nacelle 24. The gas turbine engine 22 of FIG. 2 is configured as a multi-spool, turbofan gas turbine engine. However, it should be understood that aspects of the present disclosure may be equally applicable to other configurations of gas turbine engines such as, but not limited to, a turboshaft gas turbine engine, a turboprop gas turbine engine, a turbojet gas turbine engine, a propfan gas turbine engine, an open rotor gas turbine engine, or the like. Aspects of the present disclosure may also be equally applicable to other types of aircraft propulsion systems which do not include gas turbine engines such as, but not limited to, an electric-fan propulsion system, an electric-prop propulsion system, or the like.

The gas turbine engine 22 of FIG. 2 includes a fan section 26, a compressor section 28 (e.g., including one or more bladed compressor rotors), a combustor section 30, and a turbine section 32 (e.g., including one or more bladed turbine rotors) extending sequentially along an axial centerline 34 of the propulsion system 20. The fan section 26 drives air along a bypass flow path 36 while the compressor section 28 drives air along a core flow path 38 for compression and communication into the combustor section 30 where the air is mixed with fuel and burned. Combustion gas from the combustor section 30 is directed through the turbine section 32. The turbine section 32 drives rotation of components of the fan section 26 and the compressor section 28 in response the combustion gas flow through the turbine section 32.

The nacelle 24 of FIG. 2 is configured to house and provide an aerodynamic cover for the propulsion system 20. The nacelle 24 extends axially along the axial centerline 34. The nacelle 24 extends circumferentially about (e.g., completely around) the axial centerline 34 to surround the gas turbine engine 22 and form the bypass flow path 36.

The nacelle 24 of FIG. 2 includes an air inlet 40 and an anti-icing system 42. The air inlet 40 extends circumferentially about (e.g., completely around) the axial centerline 34. The air inlet 40 forms an upstream (e.g., axially forward) end of the nacelle 24. The air inlet 40 includes an outer skin 44, an inner skin 46, a lip skin 48, and a forward bulkhead 50.

FIG. 2 schematically illustrates a portion of the anti-icing system 42. The anti-icing system 42 is configured to provide heat energy to the air inlet 40. During operation of the propulsion system 20 (e.g., during flight of the aircraft 10; see FIG. 1), atmospheric conditions may cause the formation and/or accumulation of ice on surfaces of the air inlet 40 such as, but not limited to, the lip skin 48. The heat energy provided by the anti-icing system 42 to the air inlet 40, and particularly the lip skin 48, may thereby remove (e.g., melt) ice from the lip skin 48 (e.g., anti-icing) and/or prevent the formation and/or accumulation of ice on the lip skin 48 (e.g., de-icing). The anti-icing system 42 may be configured as an electrical resistance heating system. The electric resistance anti-icing system 42 may be configured to reduce the amount of heat energy to which air inlet 40 components 44, 46, 48, 50 are exposed (e.g., compared to heated bleed air anti-icing systems) to facilitate the use of thermoplastic materials for the air inlet 40 components 44, 46, 48, 50. For example, the electrical resistance anti-icing system 42 may be configured as or may otherwise include a carbon nanotube film applied to exterior and/or interior surfaces of the lip skin 48, the outer skin 44, and/or the inner skin 46. Passing an electrical current through this electrically conductive carbon nanotube film generates heat energy which may be used to facilitate anti-icing and/or de-icing for the air inlet 40. The present disclosure, however, is not limited to any particular configuration of the anti-icing system 42. For example, the anti-icing system 42 may alternatively be configured to direct hot, pressurized air (e.g., compressor bleed air from the compressor section 28) to the air inlet 40 to facilitate anti-icing and/or de-icing for the air inlet 40.

Figure 3:
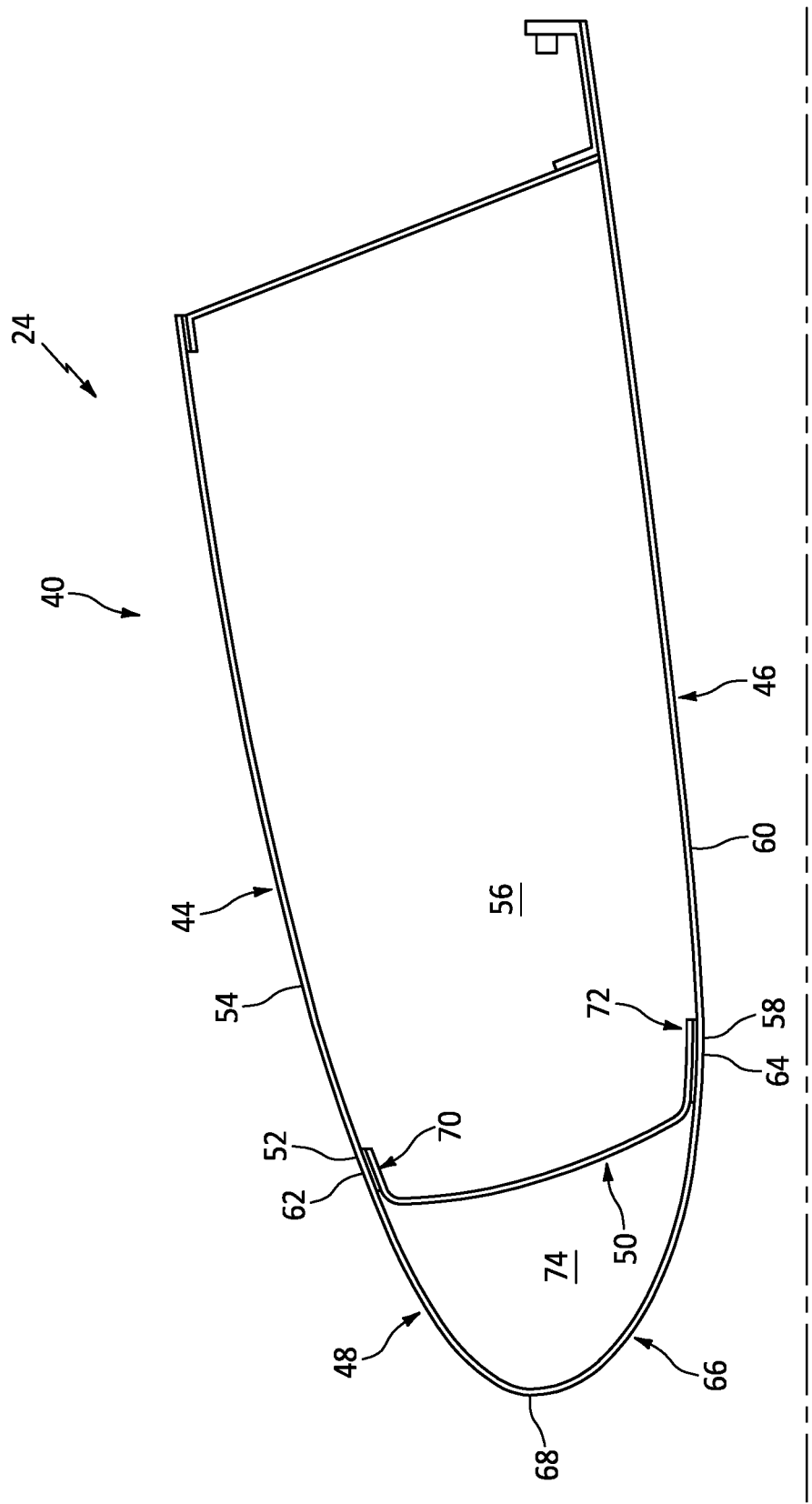
FIG. 3 illustrates a side, cutaway view of an air inlet for an aircraft propulsion system nacelle, in accordance with one or more embodiments of the present disclosure.

FIG. 3 illustrates a side, cutaway view of a portion of the air inlet 40 including the outer skin 44, the inner skin 46, the lip skin 48, and the forward bulkhead 50. As shown in FIG. 3, the air inlet 40 may include one or more additional bulkheads (e.g., an aft bulkhead).

The outer skin 44 (e.g., the outer barrel) of FIG. 3 forms an annular body extending circumferentially about (e.g., completely around) the axial centerline 34. The outer skin 48 includes a leading end 52 (e.g., an axially forward end) and an exterior surface 54. The exterior surface 54 forms a portion of the nacelle 24 exterior.

The inner skin 46 (e.g., the inner barrel) of FIG. 3 forms an annular body extending circumferentially about (e.g., completely around) the axial centerline 34. The inner skin 46 is disposed radially inward of the outer skin 44. The inner skin 46 is spaced (e.g., radially spaced) from the outer skin 44 to form a cavity 56 between the outer skin 44 and the inner skin 46. The inner skin 46 includes a leading end 58 (e.g., an axially forward end) and an interior surface 60. The interior surface 60 forms a portion of the bypass flow path 36 through the propulsion system 20 (see FIG. 2).

The lip skin 48 forms an arcuate, annular body extending circumferentially about (e.g., completely around) the axial centerline 34. The lip skin 48 extends between and to an outer end 62 (e.g., an outer radial end) of the lip skin 48 and an inner end 64 (e.g., an inner radial end) of the lip skin 48. The outer end 62 is mounted to or otherwise disposed at (e.g., on, adjacent, or proximate) the outer skin 44 (e.g., the leading end 52). The inner end 64 is mounted to or otherwise disposed at (e.g., on, adjacent, or proximate) the inner skin 46 (e.g., the leading end 58). The lip skin 48 forms an exterior surface 66. The exterior surface 66 may be disposed coincident with the exterior surface 54 and/or the interior surface 60. The exterior surface 66 forms a leading edge 68 (e.g., an axially-forwardmost edge) of the nacelle 24. The lip skin 48 further forms a portion (e.g., an axially-forward portion) of the cavity 56.

Each of the outer skin 44, the inner skin 46, and the lip skin 48 include a body material which forms all or a substantial portion of the respective outer skin 44, inner skin 46, and lip skin 48. The body material may be a polymer material such as, but not limited to, a thermoplastic material (e.g., polypropylene (PP), polyethylene (PE), polyvinylchloride (PVC), polystyrene (PS), polyethylene terephthalate (PET), polycarbonate (PC), polyether ether ketone (PEEK), polyetherimide (PEI), etc.). The body material may be a fiber-reinforced composite material including a fiber-reinforcement material embedded in a polymer matrix. For example, the body material may include a fiberglass, carbon fiber, aramid or para-aramid synthetic fibers, or the like embedded in a polymer matrix material such as, but not limited to, a thermoplastic material. The body material for the outer skin 44, the inner skin 46, and/or the lip skin 48, however, is not limited to a polymer material or a fiber-reinforced composite material. For example, the body material may alternatively be a metal or metal alloy such as, but not limited to aluminum or titanium. The body material for each of the outer skin 44, the inner skin 46, and the lip skin 48 may be the same. Alternatively, the body material for each of the outer skin 44, the inner skin 46, and the lip skin 48 may be different from the body material one or more of the others of the outer skin 44, the inner skin 46, and the lip skin 48. While discussed above as discrete components, the outer skin 44, the inner skin 46, and the lip skin 48 may form a unitary component with one or more others of the outer skin 44, the inner skin 46, and the lip skin 48.

The forward bulkhead 50 forms an annular body extending circumferentially about (e.g., completely around) the axial centerline 34. The forward bulkhead 50 may be formed by a single panel or by a plurality of circumferentially arranged panel segments. The forward bulkhead 50 extends between and to an outer end 70 (e.g., an outer radial end) of the forward bulkhead 50 and an inner end 72 (e.g., an inner radial end) of the forward bulkhead 50. The outer end 70 is mounted to the lip skin 48 at (e.g., on, adjacent, or proximate) the outer end 62. The outer end 70 may alternatively be mounted to the outer skin 44 at (e.g., on, adjacent, or proximate) the leading end 52 or mounted to both of the lip skin 48 and the outer skin 44. The inner end 72 is mounted to the lip skin 48 at (e.g., on, adjacent, or proximate) the inner end 64. The inner end 72 may alternatively be mounted to the inner skin 46 at (e.g., on, adjacent, or proximate) the leading end 58 or mounted to both of the lip skin 48 and the inner skin 46. The forward bulkhead 50 may, therefore, provide structural support and rigidity for the air inlet 40. The forward bulkhead 50 also subdivides the cavity 56 to form a duct 74 (sometimes referred to as a "D-duct") at the lip skin 48. The anti-icing system 42 (see FIG. 2) may be configured to direct hot, pressurized air into the duct 74 to provide anti-icing and/or de-icing functionality for the lip skin 48. Alternatively, for the anti-icing system 42 configured as an electrical resistance heating system, the anti-icing system 42 may be disposed within the duct 74 to direct thermal energy to the lip skin 48.

During operation of a propulsion system (e.g., during flight of an associated aircraft), such as the propulsion system 20, the propulsion system may be susceptible to high-velocity impact events caused by collisions with birds (i.e., "bird strikes"). Certain portions of the propulsion system and its nacelle (e.g., the air inlet) may be configured to facilitate resistance to bird strikes and to protect internal components of the propulsion system from bird strike impacts. The use of lightweight materials (e.g., thermoset and thermoplastic polymer materials) for all or portions of a nacelle air inlet may be desirable to reduce propulsion system weight, however, the air inlet should still have suitable structural support and rigidity while also facilitating resistance to high-velocity bird strike impacts.

Figure 5:
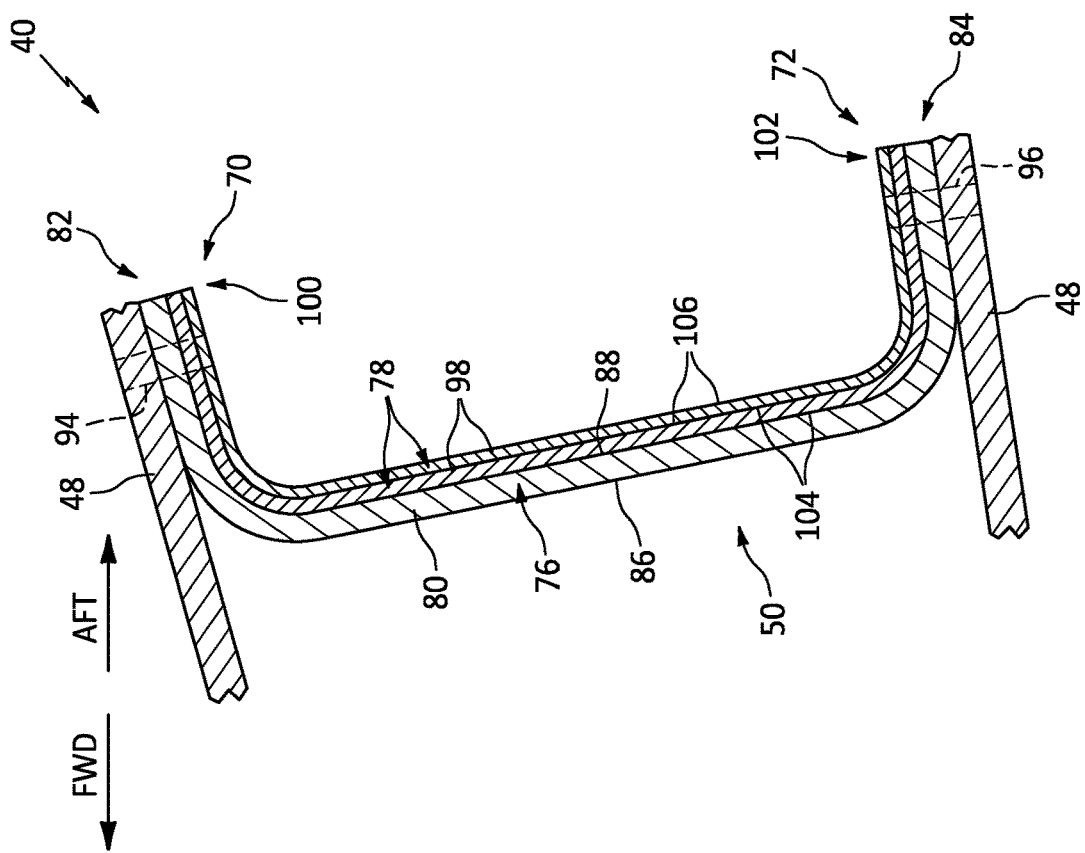
FIG. 5 illustrates a side, cutaway view of a portion of an air inlet including another bulkhead, in accordance with one or more embodiments of the present disclosure.
Figure 4:
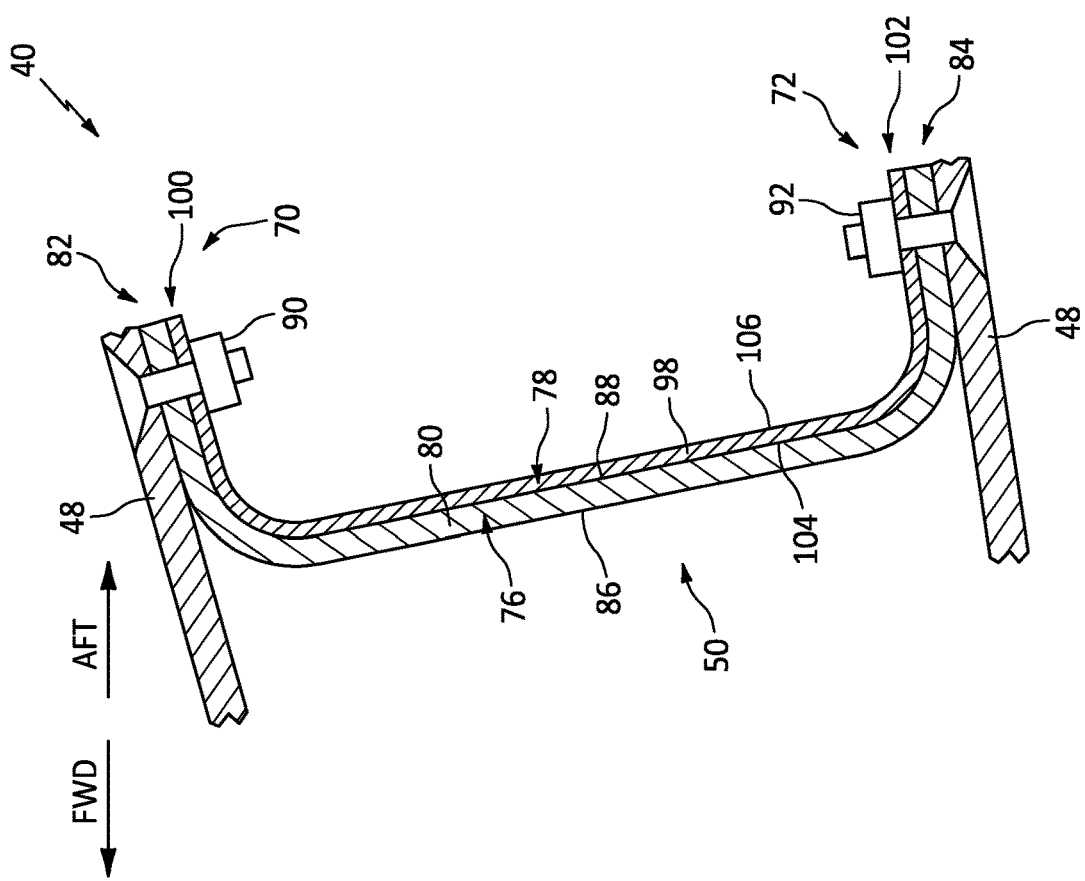
FIG. 4 illustrates a side, cutaway view of a portion of an air inlet including a bulkhead, in accordance with one or more embodiments of the present disclosure.

Referring to FIGS. 4 and 5, side, cutaway views of embodiments of the air inlet 40 are illustrated. The air inlet 40 embodiments of FIGS. 4 and 5 include the forward bulkhead 50 and portions of the outer skin 44 and the inner skin 46. The forward bulkhead 50 of FIGS. 4 and 5 includes a first bulkhead portion 76 and at least one second bulkhead portion 78.

The first bulkhead portion 76 includes a first bulkhead body 80. The first bulkhead body 80 extends between and to an outer end 82 (e.g., an outer radial end) of the first bulkhead body 80 and an inner end 84 (e.g., an inner radial end) of the first bulkhead body 80. The first bulkhead body 80 forms a first side 86 and a second side 88 opposite the first side 86. The first side 86 and the second side 88 extend from the outer end 82 to the inner end 84. The first side 86 is disposed upstream (e.g., axially forward) of the second side 88. The first bulkhead body 80 may be configured as an annular body extending circumferentially about (e.g., completely around) the axial centerline 34. Alternatively, the first bulkhead body 80 may be formed by a plurality of discrete body panels arranged circumferentially about (e.g., completely around) the axial centerline 34.

The first bulkhead body 80 is mounted to the outer skin 44 and the inner skin 46. The first bulkhead body 80 may be mounted to the outer skin 44 at (e.g., on, adjacent, or proximate) the outer end 82. The first bulkhead body 80 may be curved such that a portion of the first bulkhead body 80 at (e.g., on, adjacent, or proximate) the outer end 82 extends along the outer skin 44 (e.g., the first side 86 is flush with the outer skin 44). The first bulkhead body 80 may be mounted to the inner skin 46 at (e.g., on, adjacent, or proximate) the inner end 84. The first bulkhead body 80 may be curved such that a portion of the first bulkhead body 80 at (e.g., on, adjacent, or proximate) the inner end 84 extends along the inner skin 46 (e.g., the first side 86 is flush with the inner skin 46). The first bulkhead body 80 of FIG. 4 is mounted to the outer skin 44 by outer fasteners 90 (e.g., a plurality of circumferentially distributed fasteners) at (e.g., on, adjacent, or proximate) the outer end 82. The first bulkhead body 80 of FIG. 4 is mounted to the inner skin 46 by inner fasteners 92 (e.g., a plurality of circumferentially distributed fasteners) at (e.g., on, adjacent, or proximate) the inner end 84. Alternatively, the first bulkhead body 80 of FIG. 5 is mounted to the outer skin 44 by outer weld joints 94 (e.g., a plurality of circumferentially distributed thermoplastic weld joints) at (e.g., on, adjacent, or proximate) the outer end 82 and formed between the outer skin 44 and the first bulkhead body 80. The first bulkhead body 80 of FIG. 5 is mounted to the inner skin 46 by outer weld joints 96 (e.g., a plurality of circumferentially distributed thermoplastic weld joints) at (e.g., on, adjacent, or proximate) the inner end 84 and formed between the inner skin 46 and the first bulkhead body 80. The present disclosure, however, is not limited to any particular mounting configuration of the first bulkhead body 80 and the first bulkhead body 80 may be mounted to the outer skin 44 and the inner skin 46 using a combination of the fasteners 90, 92 and the weld joints 94, 96 of FIGS. 4 and 5 or using any other suitable mounting structure, hardware, or configuration.

The first bulkhead body 80 includes a rigid body material which forms all or a substantial portion of the first bulkhead body 80. The first bulkhead body 80 and its rigid body material are configured to provide structural support and structural rigidity for the air inlet 40. The rigid body material may be a fiber-reinforced composite material including a fiber-reinforcement material embedded in a thermoplastic polymer matrix (e.g., a thermoplastic composite material). The rigid body material of the first bulkhead body 80 may, for example, be the same as the body material for the outer skin 44, the inner skin 46, and/or the lip skin 48.

The second bulkhead portion 78 includes a second bulkhead body 98. The second bulkhead body 98 extends between and to an outer end 100 (e.g., an outer radial end) of the second bulkhead body 98 and an inner end 102 (e.g., an inner radial end) of the second bulkhead body 98. The second bulkhead body 98 forms a first side 104 and a second side 106 opposite the first side 104. The first side 104 and the second side 106 extend from the outer end 100 to the inner end 102. The first side 104 is disposed upstream (e.g., axially forward) of the second side 106. The first side 104 is disposed at (e.g., on, adjacent, or proximate) the second side 88. For example, the first side 104 may extend along (e.g., coincident with) the second side 88 from the outer end 100 to the inner end 102. The first side 104 may be bonded (e.g., using an adhesive) or otherwise fixedly attached to the second side 88 between the outer end 100 and the inner end 102. However, the present disclosure is not limited to any bonding or other fixed attachment of the second of the first side 104 the second side 88. The second bulkhead body 98 may be configured as an annular body extending circumferentially about (e.g., completely around) the axial centerline 34. Alternatively, the second bulkhead body 98 may be formed by a plurality of discrete body segments arranged circumferentially about (e.g., completely around) the axial centerline 34.

The second bulkhead body 98 is mounted to the outer skin 44, the inner skin 46, and the first bulkhead body 80. The second bulkhead body 98 may be mounted to the outer skin 44 and the first bulkhead body 80 at (e.g., on, adjacent, or proximate) the outer end 100. The second bulkhead body 98 may be mounted to the inner skin 46 and the first bulkhead body 80 at (e.g., on, adjacent, or proximate) the inner end 102. The second bulkhead body 98 of FIG. 4 is mounted to the outer skin 44 and the first bulkhead body 80 by the outer fasteners 90 at (e.g., on, adjacent, or proximate) the outer end 100. The second bulkhead body 98 of FIG. 4 is mounted to the inner skin 46 and the first bulkhead body 80 by the inner fasteners 92 (e.g., a plurality of circumferentially distributed fasteners) at (e.g., on, adjacent, or proximate) the inner end 102. Alternatively, the second bulkhead body 98 of FIG. 5 is mounted to the outer skin 44 and the first bulkhead body 80 by the outer weld joints 94 at (e.g., on, adjacent, or proximate) the outer end 100 and formed between the outer skin 44, the first bulkhead body 80, and the second bulkhead body 98. The second bulkhead body 98 of FIG. 5 is mounted to the inner skin 46 by the outer weld joints 96 at (e.g., on, adjacent, or proximate) the inner end 102 and formed between the inner skin 46, the first bulkhead body 80, and the second bulkhead body 98. The present disclosure, however, is not limited to any particular mounting configuration of the second bulkhead body 98 and the second bulkhead body 98 may be mounted to the outer skin 44, the inner skin 46, and the first bulkhead body 80 using a combination of the fasteners 90, 92 and the weld joints 94, 96 of FIGS. 4 and 5 or using any other suitable mounting structure, hardware, or configuration.

The second bulkhead body 98 includes a flexible body material which forms all or a substantial portion of the second bulkhead body 98. The second bulkhead body 98 and its flexible body material are configured to facilitate resistance to high-velocity bird strike impacts, as will be discussed in further detail. As used herein, the term "flexible" should be understood to indicate that the flexible body material is more flexible (e.g., less rigid) than the rigid body material of the first bulkhead body 80. However, the flexible body material of the second bulkhead body 98 still possesses sufficient rigidity to materially contribute to the structural support and rigidity of the air inlet 40 facilitated by the forward bulkhead 50.

Figure 6:
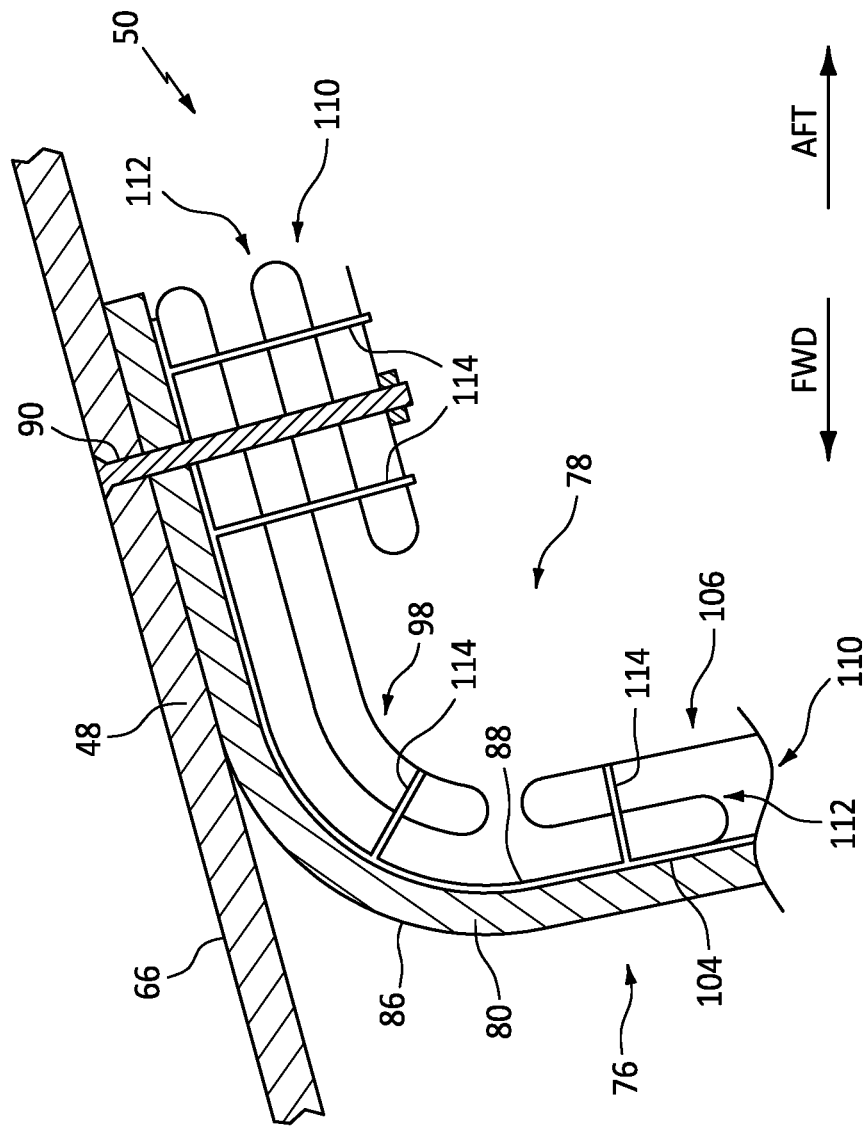
FIG. 6 illustrates a side, cutaway view of a bulkhead, in accordance with one or more embodiments of the present disclosure.

The flexible body material of the second bulkhead body 98 may be formed by one or more layers of a woven fabric 110 (e.g., a net and/or flexible webbing configuration) as shown, for example, in FIG. 6. Each layer of the woven fabric 110 may include fibers assembled together in an overlapping woven pattern. The woven fabric 110 may be formed by high-strength synthetic fibers such as, but not limited to, aramid or para-aramid synthetic fibers, nylon fibers, high modulus polyethylene (HMPE) fibers, and the like. For example, the woven fabric 110 may be formed by high-strength synthetic fibers such as those sold as KEVLAR® (E. I. Du Pont de Nemours and Co., Wilmington, Del.) fibers. The woven fabric 110 forming the flexible body material may be configured with a plurality of overlapping folds 112 of the woven fabric 110. The overlapping folds 112 of the woven fabric 110 may be held together by one or more stitches 114 of the flexible body material.

Figure 7:
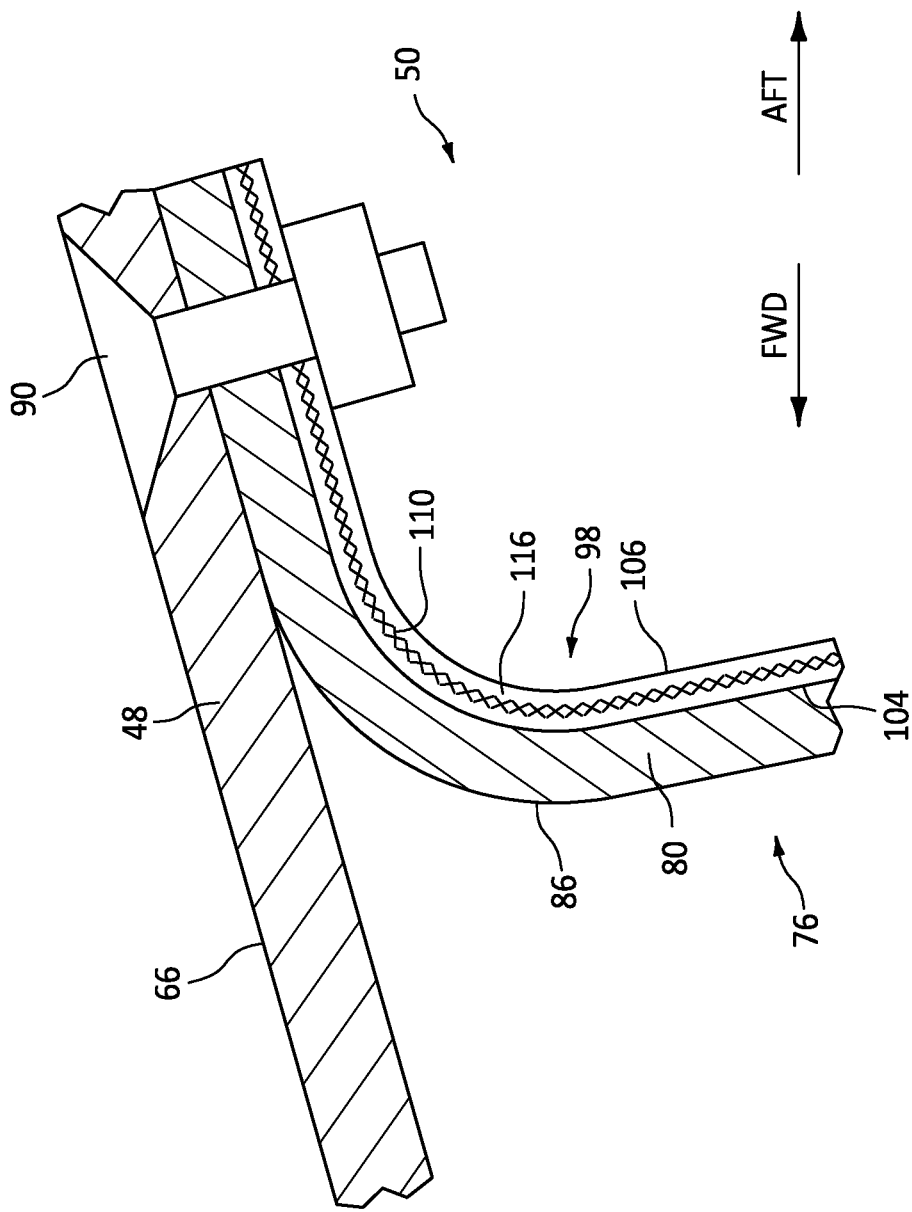
FIG. 7 illustrates a side, cutaway view of another bulkhead, in accordance with one or more embodiments of the present disclosure

Alternatively, the flexible body material of the second bulkhead body 98 may be formed by one or more layers (e.g., plies) configured as a composite layup. For example, the flexible body material maybe formed by one or more layers of a woven fabric 110 embedded in a thermoplastic polymer matrix 116 as shown, for example, in FIG. 7. As also shown in FIG. 7, the second bulkhead body 98 and its flexible body material may be a discrete component disposed at (e.g., on, adjacent, or proximate) the first bulkhead body 80. Alternatively, the second bulkhead body 98 and the first bulkhead body 80 may form a single, unitary component (e.g., the woven fabric 110 may be embedded in the thermoplastic polymer matrix of the first bulkhead body 80). Each layer of the woven fabric 110 may be configured without overlapping folds (e.g., the overlapping folds 112 of FIG. 6). Alternatively, the woven fabric 110 may be configured with overlapping folds such as the overlapping folds 112 of FIG. 5. Overlapping folds of the woven fabric 110 may be held together (e.g., embedded within) by the thermoplastic polymer matrix 116 as opposed to the use of stitches 114 as in the flexible body material of FIG. 6. The second bulkhead body 98 of FIG. 7 may provide greater rigidity in comparison to the second bulkhead body 98 of FIG. 6.

As shown in FIG. 5, the forward bulkhead 50 may include a plurality of second bulkhead portions 78 disposed axially in series. Each of the second bulkhead portions 78 may be mounted to the outer skin 44 and the inner skin 46, as described above. For example, the first bulkhead body 80 and the second bulkhead body 98 of each respective second bulkhead portion 78 may be mounted to the outer skin 44 and the inner skin 46 by the fasteners 90, 92 or the weld joints 94, 96. Each of the second bulkhead portions 78 may be substantially the same (e.g., the same flexible body material) as each other of the second bulkhead portions 78. Alternatively, one or more of the second bulkhead portions 78 may be different than one or more other second bulkhead portions 78.

Figure 8:
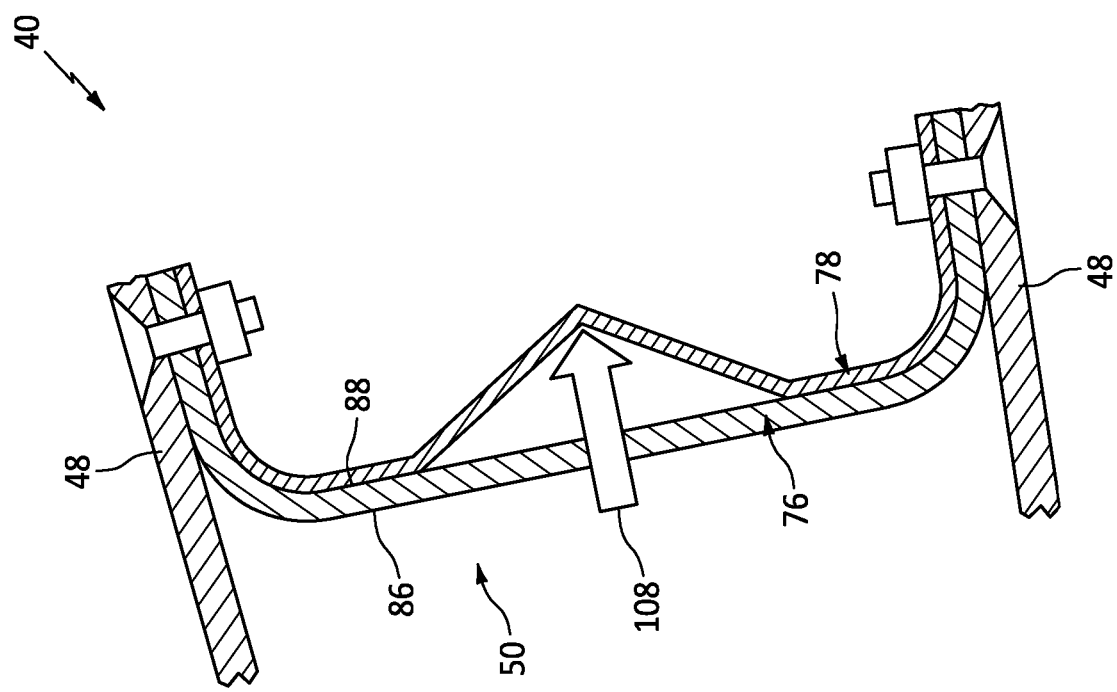
FIG. 8 illustrates a side, cutaway view of portions of the air inlet and the forward bulkhead of FIG. 4 experiencing a bird strike impact, in accordance with one or more embodiments of the present disclosure.

FIG. 8 illustrates an exemplary bird strike impact 108 for the air inlet 40. For some particularly high-velocity bird strike impacts, such as the bird strike impact 108, a bird may penetrate the first bulkhead portion 76 (e.g., pass through the first side 86 and the second side 88). The flexible body material of the at least one second bulkhead portion 78 may subsequently reduce (e.g., absorb) the energy of the bird for the bird strike impact 108. For example, the second bulkhead body 98 may absorb impact energy of the bird strike impact 108 as the woven fabric 110 as the stitches 114 or the thermoplastic polymer matrix break retaining the folds 112 breaks, and the folds 112 unfold under load from the bird strike impact 108. Alternatively, the bird strike impact 108 may break through at least some of the thermoplastic polymer matrix and be caught by the overlapping fibers for the embedded woven fabric 110 of the at least one second bulkhead portion 78, thereby reducing the energy of the bird for the bird strike impact 108 and without allowing the bird for the bird strike impact 108 to pass through the at least one second bulkhead portion 78. The at least one second bulkhead portion 78 may expand and/or stretch, as shown for example in FIG. 6, to further reduce (e.g., absorb) the energy of the bird for the bird strike impact 108. The forward bulkhead 50 of the present disclosure may, therefore, facilitate a reduction in the amount of bird strike impact 108 energy which is transmitted to the outer skin 44 and/or the inner skin 46 by the forward bulkhead 50. Moreover, the forward bulkhead 50 of the present disclosure may facilitate the use of lightweight materials for the air inlet 40 (e.g., the forward bulkhead 50) while also facilitating, with the forward bulkhead 50, suitable structural support and rigidity for the air inlet 40 and the ability to absorb the full impact energy of a high-velocity bird strike event.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. An air inlet for an aircraft propulsion system nacelle, the air inlet comprising:
    an outer skin extending circumferentially about an axial centerline of the air inlet;
    an inner skin extending circumferentially about the axial centerline, the inner skin disposed radially inward of the outer skin, the inner skin radially spaced from the outer skin to form a cavity between the outer skin and the inner skin;
    a lip skin extending circumferentially about the axial centerline, wherein the lip skin extends between and to an outer end and an inner end, the outer end is disposed at the outer skin, the inner end is disposed at the inner skin, and the lip skin forms a leading edge of the air inlet, the lip skin forming an axially-forward portion of the cavity; and
    a forward bulkhead extending circumferentially about the axial centerline, the forward bulkhead subdividing the cavity to form a duct at the lip skin, wherein the forward bulkhead includes a first bulkhead portion and a second bulkhead portion, the first bulkhead portion extends between and to a first outer end and a first inner end, the second bulkhead portion extends between and to a second outer end and a second inner end, the first bulkhead portion and the second bulkhead portion are mounted to the outer skin at the first outer end and the second outer end, respectively, the first bulkhead portion and the second bulkhead portion are mounted to the inner skin at the first inner end and the second inner end, respectively, a side of the first bulkhead portion extending from the first outer end to the first inner end is fixedly attached to a side of the second bulkhead portion extending from the second outer end to the second inner end, and the first bulkhead portion includes a rigid body material and the second bulkhead portion includes a flexible body material and one or more stitches configured to attach the flexible body material in a first configuration;
    wherein the one or more stitches are configured to break in a second configuration.

2. The air inlet of claim 1, wherein the rigid body material includes a thermoplastic composite material.

3. The air inlet of claim 2, wherein the flexible body material includes one or more layers of a woven fabric.

4. The air inlet of claim 3, wherein each layer of the one or more layers of the woven fabric includes synthetic fibers assembled together in an overlapping woven pattern.

5. The air inlet of claim 3, wherein the flexible body material includes the one or more layers of the woven fabric embedded in a thermoplastic matrix.

6. The air inlet of claim 3, wherein the one or more layers of the woven fabric includes a first woven fabric layer and the first woven fabric layer includes one or more overlapping folds held in place by the one or more stitches.

7. The air inlet of claim 2, wherein the first bulkhead portion is disposed axially forward of the second bulkhead portion.

8. The air inlet of claim 7, wherein the second bulkhead portion extends along the first bulkhead portion from the second outer end to the second inner end.

9. The air inlet of claim 2, wherein:
    the first bulkhead portion and the second bulkhead portion are mounted to the outer skin by a first fastener at the first outer end and the second outer end, respectively; and
    the first bulkhead portion and the second bulkhead portion are mounted to the inner skin by a second fastener at the first inner end and the second inner end, respectively.

10. The air inlet of claim 2, wherein:
    the first bulkhead portion and the second bulkhead portion are mounted to the outer skin by a first weld joint at the first outer end and the second outer end, respectively; and
    the first bulkhead portion and the second bulkhead portion are mounted to the inner skin by a second weld joint at the first inner end and the second inner end, respectively.

11. The air inlet of claim 1, wherein the second configuration includes a bird strike impact that penetrates the first bulkhead portion.

12. An air inlet for an aircraft propulsion system nacelle, the air inlet comprising:
    an outer skin extending circumferentially about an axial centerline of the air inlet;
    an inner skin extending circumferentially about the axial centerline, and the inner skin disposed radially inward of the outer skin;
    a lip skin extending circumferentially about the axial centerline, wherein the lip skin extends between and to an outer end and an inner end, the outer end is disposed at the outer skin, the inner end is disposed at the inner skin, and the lip skin forms a leading edge of the air inlet; and
    a forward bulkhead extending between and mounted to the outer skin and the inner skin,
    wherein the forward bulkhead includes a first bulkhead portion and a second bulkhead portion, the first bulkhead portion is fixedly attached to and axially forward of the second bulkhead portion, the first bulkhead portion includes a rigid body material and the second bulkhead portion includes a flexible body material, wherein the second bulkhead portion is a composite layup including one or more layers of woven fabric embedded in a thermoplastic polymer matrix.

13. The air inlet of claim 12, wherein the second bulkhead portion is bonded to the first bulkhead portion.

14. The air inlet of claim 12, wherein the rigid body material includes a thermoplastic composite material.

15. The air inlet of claim 14, wherein the flexible body material includes one or more layers of a woven fabric.

16. The air inlet of claim 15, wherein the first bulkhead portion and the second bulkhead portion are mounted together.

17. An air inlet for an aircraft propulsion system nacelle, the air inlet comprising:
   an outer skin extending circumferentially about an axial centerline of the air inlet;
   an inner skin extending circumferentially about the axial centerline, and the inner skin disposed radially inward of the outer skin;
   a lip skin extending circumferentially about the axial centerline, wherein the lip skin extends between and to an outer end and an inner end, the outer end is disposed at the outer skin, the inner end is disposed at the inner skin, and the lip skin forms a leading edge of the air inlet; and
   a forward bulkhead extending circumferentially about the axial centerline, wherein the forward bulkhead includes a first bulkhead portion and a second bulkhead portion, the first bulkhead portion extends between and to a first outer end and a first inner end, the second bulkhead portion extends between and to a second outer end and a second inner end, the first outer end is disposed at the outer skin and the first inner end is disposed at the inner skin, the second outer end and the second inner end are disposed at the first bulkhead portion, the second bulkhead portion extends along the first bulkhead portion from the second outer end to the second inner end, the first bulkhead portion fixedly attached to the second bulkhead portion such that the first bulkhead and the second bulkhead form a single, unitary component, and the first bulkhead portion includes a rigid body material and the second bulkhead portion includes a flexible body material.

18. The air inlet of claim 17, wherein the first bulkhead portion is disposed axially forward of the second bulkhead portion.

19. The air inlet of claim 17, wherein the first bulkhead portion and the second bulkhead portion are mounted to the outer skin by a first fastener at the first outer end and the second outer end, respectively.

20. The air inlet of claim 17, wherein the first bulkhead portion and the second bulkhead portion are mounted to the outer skin by a first weld joint at the first outer end and the second outer end, respectively.

* * * * *